United States Patent [19]
Holmes, Jr.

[11] Patent Number: 5,499,165
[45] Date of Patent: Mar. 12, 1996

[54] TRANSPARENT EDGE-LIT LIGHTING PANE FOR DISPLAYS

[76] Inventor: Lawrence Holmes, Jr., P.O. Box 325, Midland Park, N.J. 07432-0325

[21] Appl. No.: 958,492

[22] Filed: Oct. 8, 1992

[51] Int. Cl.$^6$ .................................................. F21V 8/00
[52] U.S. Cl. .............................. 362/31; 362/98; 362/256; 362/267; 362/330; 40/546
[58] Field of Search ............................ 313/113; 40/152.2, 40/546, 547, 569; 362/26, 27, 31, 223, 255, 256, 267, 330, 98, 99; 359/48, 49, 50

[56] References Cited

U.S. PATENT DOCUMENTS

| | | | |
|---|---|---|---|
| 3,267,598 | 8/1966 | Olesen et al. | 40/546 |
| 3,402,492 | 9/1968 | Clapham, Jr. | 40/546 |
| 3,464,133 | 9/1969 | De Poray | 40/152.2 |
| 4,252,416 | 2/1981 | Jaccard | 362/26 |
| 4,277,817 | 7/1981 | Hehr | 362/31 |
| 4,373,282 | 2/1983 | Wragg | 40/546 |
| 4,737,896 | 4/1988 | Mochizuki et al. | 359/49 |
| 4,751,615 | 6/1988 | Abrams | 362/31 |
| 5,040,098 | 8/1991 | Tanaka et al. | 362/31 |
| 5,050,946 | 9/1991 | Hathaway et al. | 362/31 |
| 5,064,276 | 11/1991 | Endo et al. | 362/31 |
| 5,089,816 | 2/1992 | Holmes, Jr. | 340/995 |
| 5,151,679 | 9/1992 | Dimmick | 362/31 |

*Primary Examiner*—Ira S. Lazarus
*Assistant Examiner*—Alan B. Cariaso
*Attorney, Agent, or Firm*—Joseph L. Strabala

[57] ABSTRACT

A transparent edge-lit window pane for lighting displays and the like through which maps, pictures and photographs which are illuminated thereby can be viewed by an observer includes a generally rectangular panel of transparent material tapering from one edge to the opposite edge to form a wedge shape, a linear light source imbedded in and sealed thereto along the one edge with a sealant having an index of refraction close to that of the panel and etching on one planar surface of the panel whereby it greatly increase the amount of light egressing from the pane toward the display without clouding the chart from the observer. The linear light source may include a semi-circular length-wise reflector to increase the amount of light entering the edge of the pane from the light source.

5 Claims, 2 Drawing Sheets

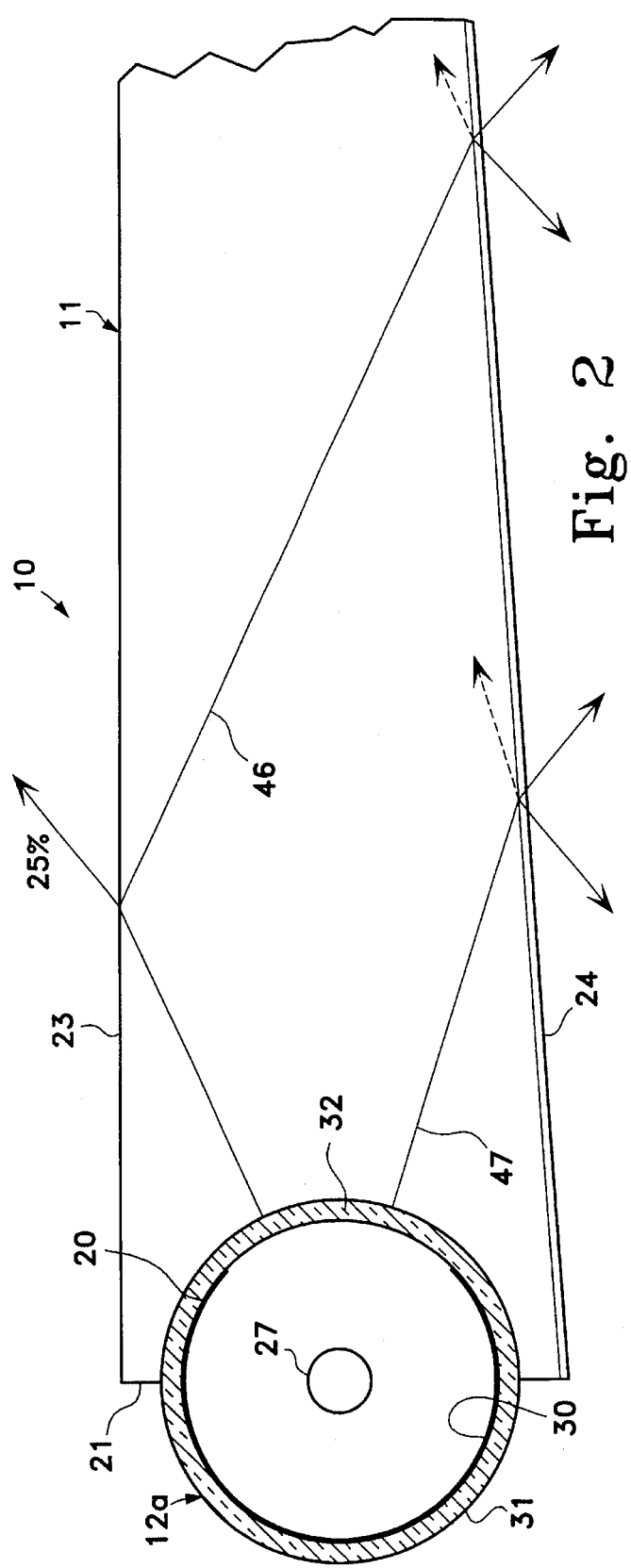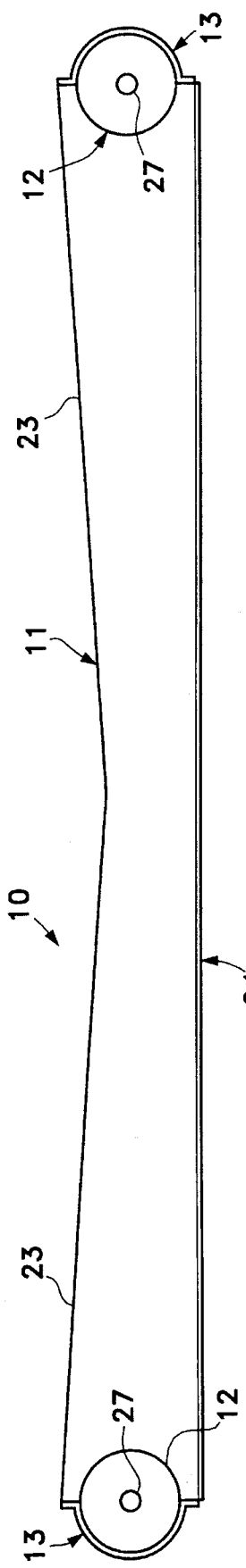

TRANSPARENT EDGE-LIT LIGHTING PANE FOR DISPLAYS

BACKGROUND OF INVENTION

In some environments, such as the cockpits of aircraft, it is desirable to illuminate devices, such as instruments and displays, without increasing the level of ambient light in the cockpit. Increasing the level of ambient light sufficiently to view such devices will destroy the night vision of the pilot of the aircraft in this environment creating a safety hazard. As a result aircraft instruments are often illuminated by red lamps placed around the perimeter of an instrument but screened from direct view by the instrument panel, a border or a frame. This compromise creates adequate illumination at the edges of the instrument but often leads to inadequate or dim lighting of the central part of the instrument.

There are other environments, such as liquid crystal displays with maps, photographs, charts and the like placed behind the liquid crystal display which have problems with lighting because of the high loss of light as it passes and repasses through the liquid crystal display. In a liquid crystal display 75% of the ambient light is lost as it passes through the display due to the polarization which occurs therein; if this light is reflected back off of a depolarizing surface, such as paper, through the display in the reverse direction, less than 25% of the initial 25% of light, or 6% of the total light passing into the display will emerge from the display. For this reason liquid crystal displays are often back-lighted or back-lit to make them operable.

Problems with illumination in these environments have been addressed with edge-lit thin panel illuminators for instruments, maps, charts and the like where ambient light is unsuitable, unavailable or unusable. One of such devices is disclosed in U. S. Pat. No. 4,373,282 issued to Robert Wragg. In U.S. Pat. No. 5,089,916 issued to Lawrence Holmes, Jr. an edge-lit light wedge is employed to front light a chart or a map and to back light a liquid crystal display to obtain a functional navigational instrument.

Of course there are other devices employing edge-lit devices such as signs of the type shown in U.S. Pat. No. 4,385,343 issued to George W. Plumly and greeting cards having edge-lit displays as shown in U.S. Pat. No. 4,975,809 issued to Mihg-ho Ku.

The current invention relates to an improved edge-lit light wedge, referred to as a pane herein, which is suitable for the illumination of the navigational instrument described by Holmes in his patent and for other applications, such as liquid crystal displays with or without a map or chart underlaying such displays. For example liquid crystal displays or screens of portable computers can employ this novel edge-lit light pane to uniformly back light the screen leading to thinner display devices without any loss of performance.

An advantage of this novel invention is the ability to provide a highly efficient edge-lit pane which can be manufactured economically.

Another advantage of this novel invention is that its increased efficiency which allows it to be employed in applications which were previously unsuitable for such devices.

To achieve these advantages the novel invention employs a general configuration similar to the edge-lit light wedge described in the Holmes Patent, supra, but with modifications which greatly enhance its performance.

SUMMARY OF INVENTION

An edge-lit window pane for lighting displays through which maps, pictures and photographs illuminated thereby can be viewed in environments having a low ambient light level includes a generally rectangular panel of transparent material having a top surface and bottom surface, the top surface tapering from one edge to its opposite edge to configure said panel in a wedge shape, the panel having an arcuate groove formed in said one edge, at least one linear light source means, the source imbedded in and sealed in said arcuate groove with a clear sealant having an index of refraction approximating that of the panel, and etching on the bottom surface of the panel sufficient to enhance the refraction of light within the panel hitting the bottom surface but not so rough as to make said panel sufficiently translucent to obscure said display whereby the amount of light egressing from the pane toward the display is increased dramatically.

The device may also be defined as an illuminating device for articles needing illumination in environments having low ambient light levels including an article needing illumination, an edge-lit window pane having a generally rectangular panel of transparent material having a top surface and bottom surface, said top surface tapering from one edge to its opposite edge to configure said panel in a wedge shape, the panel having an arcuate groove formed in the one edge and mounted in front of the article with its bottom surface facing the article, at least one linear light source means, the source imbedded in and sealed in the arcuate groove with a clear sealant having an index of refraction approximating that of the panel, and etching on the bottom surface of the panel sufficient to enhance the refraction of light within said panel but not so rough as to make said panel sufficiently translucent to obscure said article whereby the amount of light egressing from the pane toward the article illuminates it without increasing the level of ambient light in the environment.

BRIEF DESCRIPTION OF THE DRAWINGS

The novel invention is described, and will be better understood in reference to the attached drawings, which form part of the disclosure, wherein:

FIG. 2 is a broken away portion of the novel edge-lit pane using an alternate linear light source with an internal reflector, as well as empirically illustrating the effect of the etching or frosting on the bottom surface of the panel forming the principal part of the novel pane or window pane; and FIG. 3 is an edge view of an alternate design employing a compound wedge and dual linear light sources.

DETAILED DESCRIPTION OF A PREFERRED EMBODIMENT

Figure 1:
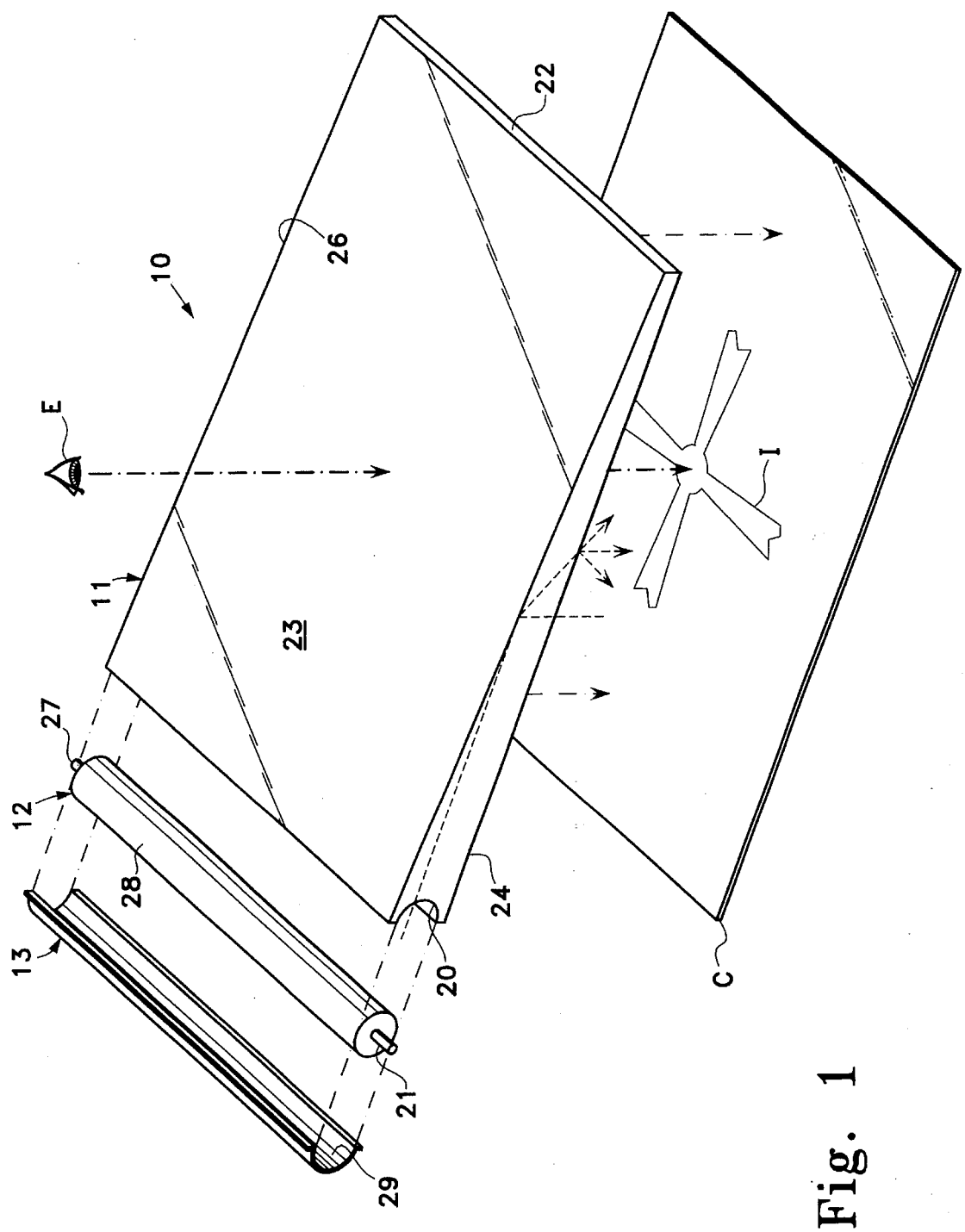
FIG. 1 is an exploded perspective of the novel edge-lit pane with the linear light source and its associated reflector shown extracted from the edge of its principal panel.

A schematic illustration of one of the applications for this novel invention is found in FIG. 1 wherein the edge-lit pane or window pane 10 is placed above a chart C so the eye E of an observer may view the chart through the pane. As can be seen in this drawing the pane is composed of three parts; a generally rectangular panel 11, a linear light source 12 and a reflector 13, shown in exploded perspective. In this application the edge-lit pane is employed to illuminate the image "T" on the chart so the observer can better see it when the available ambient light level is not sufficient to illuminate the chart.

In the drawings the three principal components of the edge-lit pane are shown assembled. To describe the construction of the novel edge-lit pane reference is made to FIG. 1. Its principal component, as shown in these figures, is the thin rectangular panel 11 formed of a transparent material, such as clear plastic, glass or a similar material. This panel includes an arcuate groove 20 along one of its edges 21. From edge 21 of the panel to its opposite edge 22, the thin edge, the panel is tapered whereby it has a wedge shape as can be seen in FIGS. 1 and 2. Because of the taper the top surface 23 of the panel is angularly disposed relative to the bottom surface 24 which bottom surface is perpendicular to the edges of the panel. Since the panel is transparent it is possible for an observer to look through the panel as illustrated in FIG. 1. As can also be seen in FIG. 1 the other two edges 25 and 26 of the panel are parallel to one another as well as also being perpendicular to the bottom surface.

To assemble the novel edge-lit pane the elongated linear light source 12, which can be a fluorescent tube or lamp, is inserted into the arcuate groove 20 of the panel 11. Prior to inserting this tube or lamp a clear glue or sealant (not shown in the drawing because it is a thin film), which has an index of refraction approximately matching the index of refraction of the panel, is used to coat the groove so that the exterior surface 28 of the tube is "joined or welded" to the panel without any gaps or discontinuities between the tube's exterior surface and the arcuate groove of the panel when it is inserted. If the index of refraction of the tube is close to that of the panel and the glue, the light loss from the inside of the tube to the inside of the panel is extremely small. In respect to this assembly the glue need not be a permanent type. If a semi-permanent glue is used the fluorescent tube can be replaced when it fails. Alternatively if the panel is made of a low cost plastic the entire assembly may be discarded if the lamp fails.

The linear lamp 12 includes electrical pins 27 by which it can be connected to a power source for illuminating it. In general available fluorescent tubes are employed because of their cooler operation and uniformity of the lumens along their length (no dark spots).

To complete the assembly the same glue is used to coat the exposed arcuate surface 28 of the linear light source 12 mounted in the panel 11, in this case the fluorescent tube. Thereafter a curved reflector 13, with a semi-circular shape, is fitted to this surface of the tube so there are no discontinuities between the reflector and the exterior surface of the tube by allowing the glue to fill any gaps between the tube and the reflecting surface 29 of the reflector.

While fluorescent tubes are preferred, there is no reason why incandescent lamps, having a filament running the length of the tube between the electrical pins 27, cannot be used as the linear light source 12. However, more power is required to operate such lamps and their operation will occur at an elevated temperature.

In reference to the reflector 13, it also may be incorporated within the tube as shown in FIG. 2. In this special lamp 12a the internal surface 30 of the tube 31 is coated with silver to form a reflective or mirror surface for approximately 270 degrees leaving a lengthwise wise window 32 for light to egress, as illustrated in FIG. 2. In the fluorescent model illustrated in FIG. 2 an alternated reflective coating can be used and the phosphor applied directly to this coating. Such lamps can be purchased from LCD Lighting Inc. located at 11 Cascade Blvd., Milford, Conn. Alternatively the incorporated reflector 30 can be applied to the exterior surface 29 of the tube by applying silver to form a mirror surface on the outside surface of the lamp covering from 180 to 270 degrees.

Fluorescent lamps of the type described can be custom fabricated for special application and such custom lamps are described in an article entitled "The Powerbeam Lamp-A New Fluorescent Light Source" by C. L. Toomey of Sylvania Lighting Products, Danvers, Mass. The narrow beam width and the high beam candle-power makes such lamps particularly suitable for edge lighting panels.

Completion of the novel edge-lit pane 10 requires the bottom surface 24 be frosted or etched. Light introduced into the edge 21 of panel 11 will be both internally reflected between the surfaces 23 and 24 of the panel and refracted; it acts as a light guide. When the waves are internally reflected by the top surface 23, about 25% of the light will be refracted. However, due to the frosting on the bottom surface of the novel pane 10, most of the light within the panel hitting this bottom surface 24 will be refracted because the frosting disrupts this smooth bottom surface as illustrated; since the angle of incidence equals the angle of reflection when the angle of incidence is less than the critical angle, a physical law of light wave propagation in a substance, these disruptions on the surface will radically change the angle of incidence of most of the internal light waves in the panel striking this surface. As a result these waves will be mostly In FIG. 2, an similar illustration is shown, by showing the propagation of waves depicted as waves 46 and 47 will be mostly refracted when they engage the bottom frosted surface 24 of the panel 11.

While other inventors have used roughened surfaces the degree of frosting or etching is critical. For example large pockets such as shown in the Wragg patent, supra, are not suitable. Here the etching or frosting must be less "rough" than the machine finish on the panel 11 when the two degree taper is formed if the panel is not injection molded. One panel was constructed from a plastic sheet ¼ inches in thickness, having a non-glare etched surface purchased from PolyCast Technology Corporation, 70 Carlisle Place, Stamford, Connecticut as product G-15 sold under P-95 bumps per linear inch. Other sources of non-glare plastics were tried with less success.

Normally these non-glare sheets are much thinner than ¼ inch and are placed with the etched surface aware from the face of the picture on which the non-glare sheet is used.

As can be appreciated, if the frosting and/or etching is too extreme (too course) the pane will become so translucent that it is impossible to see the map or chart C, illustrated in FIG. 1. Of course, as the thickness of the frosting decreases to zero it will have no effect. Thus there is an optimum thickness for the frosting or etching which is greater than zero but less than a thickness which obscures the chart C. Further it should be appreciated different materials will require a different depth of etching or frosting; e.g., glass will be different than plastic.

While the novel pane 10, according to this invention, may appear "milky" when its panel 11 is not edge-lit, it is perfectly clear when the light source 12 illuminates the panel.

Now referring back to FIG. 1 it will be seen that bottom surface 24, which is frosted, faces the chart C and it will be apparent from the above discussions that the novel edge-lit pane will greatly increase the illumination of the chart over the prior art devices, such as the light wedge shown in the Holmes patent. To test the novel edge-lit pane, the edge-lit light wedge shown in the Holmes patent was used to illuminate a chart and then compared to the illumination of the chart by the novel edge-lit pane 10 of this invention employing the same linear light source. By actual measurements, the increases in measured illumination was in the range of 540% to 720%.

In FIG. 3 an alternate embodiment of the pane 10 is illustrated wherein a compound wedge is formed in panel 11 and two or dual light sources 12 are used. In this embodiment the panel is constructed with a "V" shape as is best illustrated in the edge view of FIG. 3. In this construction two opposed light sources are imbedded in the panel which will double the input of light into the edges of the panel.

If the novel edge-lit pane 10 is used to back light liquid crystal displays for computers, the top surface of panel 11 should be coated with silver to form a mirror. This coupled with the frosting of the bottom surface 24 of the panel will give superior results while allowing such displays to be much thinner.

Having described my invention I claim:

1. An edge-lit window pane for illuminating maps, pictures and photographs placed in a display case thereunder in environments having a low ambient light level comprising:

a display case in which articles to be illuminated can be inserted;

a generally rectangular panel of transparent material having a top surface and bottom surface, said bottom surface tapering from one edge to its opposite edge to configure said panel in a wedge shape and mounted over said display case, said panel having an arcuate groove formed in one edge;

at least one linear light source means operable to provide illumination for said panel, said source imbedded in and sealed in said arcuate groove with a clear sealant having an index of refraction approximating that of said panel; and etching on said bottom surface of said panel sufficient to enhance the refraction of light within said panel hitting said bottom surface, said etching operable to enhance illumination below said bottom surface of said panel by a factor of at least 5 from said light source means but not so rough as to obscure articles placed in said display case whereby the amount of light egressing from said panel toward said display case is increased by said etching.

2. An illuminating device for articles, such as maps and publications requiring illumination in environments having low ambient light levels comprising:

an article to be illuminated;

an edge-lit window pane having a generally rectangular panel of transparent material having a top surface and bottom surface, said bottom surface tapering from one edge to its opposite edge to configure said panel in a wedge shape, said panel having an arcuate groove formed in one edge and mounted over said article with its bottom surface facing said article;

at least one linear light source means operable to edge light said panel, said source positioned in said arcuate groove; and etching on said bottom surface of said panel sufficient to enhance the refraction of light within said panel hitting said bottom surface, said etching operable to enhance said illumination below said bottom surface of said panel by a factor of at least 5 from said light source means but not so rough as to obscure said article whereby the amount of light egressing from said panel toward said article better illuminates said article.

3. The illuminating device as defined in claim 1 or 2 wherein the linear light source means is an elongated tubular lamp.

4. The illuminating device as defined in claim 1 or 2 wherein the linear light source means is an elongated tubular fluorescent lamp.

5. The illuminating device as defined in claim 4 wherein the tubular fluorescent lamp includes a reflector operable to increase the amount of light entering the edge of the panel.

* * * * *